United States Patent
Lei

(10) Patent No.: US 8,577,021 B1
(45) Date of Patent: Nov. 5, 2013

(54) 5 RINGER EQUIVALENT NUMBER (REN) RINGER CIRCUIT USING A HIGH VOLTAGE LEVEL TRANSLATOR AND A SOURCE FOLLOWER BUFFER AND METHOD THEREFOR

(75) Inventor: Jimes Lei, Milpitas, CA (US)

(73) Assignee: Supertex, Inc., Sunnyvale, CA (US)

( * ) Notice: Subject to any disclaimer, the term of this patent is extended or adjusted under 35 U.S.C. 154(b) by 875 days.

(21) Appl. No.: 12/724,298

(22) Filed: Mar. 15, 2010

Related U.S. Application Data

(60) Provisional application No. 61/295,817, filed on Jan. 18, 2010.

(51) Int. Cl.
*H04M 3/00* (2006.01)

(52) U.S. Cl.
USPC ........................................... 379/418

(58) Field of Classification Search
USPC .......................................... 379/418
See application file for complete search history.

(56) References Cited

U.S. PATENT DOCUMENTS

| 4,341,928 | A | * | 7/1982 | Stanson et al. ................ 379/418 |
| 2009/0309653 | A1 | * | 12/2009 | Luff ................................. 330/9 |
| 2009/0315594 | A1 | * | 12/2009 | Pentakota et al. ............ 327/109 |

* cited by examiner

*Primary Examiner* — Alexander Jamal
(74) *Attorney, Agent, or Firm* — Weiss & Moy, P.C.; Jeffrey D. Moy

(57) ABSTRACT

A 5 Ringer Equivalent Number (REN) ringer circuit has a wave generator. A flip-flop is coupled to the wave generator and has a non-inverting and an inverting output. A high voltage level translator is coupled to each of the non-inverting and the inverting outputs of the flip-flop. A source follower buffer is coupled to an output of each of the high voltage level translators.

20 Claims, 3 Drawing Sheets

5 RINGER EQUIVALENT NUMBER (REN) RINGER CIRCUIT USING A HIGH VOLTAGE LEVEL TRANSLATOR AND A SOURCE FOLLOWER BUFFER AND METHOD THEREFOR

RELATED APPLICATIONS

This application claims the benefit of U.S. Provisional Application No. 61/295,817 filed Jan. 18, 2010, which is incorporated herein by reference in their entirety.

FIELD OF THE INVENTION

The invention relates to a ring generator circuit and, more specifically, to a low cost ring generator circuit that is capable of driving up to 5 Ringer Equivalent Number (REN), by using a simple high voltage level translator then buffering it with a source follower stage.

BACKGROUND OF THE INVENTION

Typically, ringing generators are implemented via a collection of analog circuit equipment. With the advent of computer controlled electronic switching systems, a need arose for simple interfacing between the computer control and the ringing generator circuit. Usually elaborate interface connections had to be designed for interfacing the computer controlled logic with the logic of the ringing circuit. The logic of computers is digital in nature and of relatively low power, whereas the logic of ringing circuits is analog in nature and the ringing voltages themselves are of a relatively high level.

Such analog interface circuits as those mentioned above are costly, complex in design and require that high voltages be distributed throughout the ringing circuitry of a telephone central office.

Further, standard ring generators will output a sinusoidal waveform with at least 42 Vrms at 20 Hz. It is more complex to generate a pure sinusoidal waveform compared to an RC like waveform. The RC waveform is close enough to still be able to ring standard telephone lines. This is ideal for applications that need to ring standard analog phones commonly referred to as POTs, plain old telephones.

Therefore, a need existed to provide a system and method to overcome the above problems.

SUMMARY OF THE INVENTION

In accordance with one embodiment, a 5 Ringer Equivalent Number (REN) ringer circuit has a wave generator. A flip-flop is coupled to the wave generator and has a non-inverting and an inverting output. A high voltage level translator is coupled to each of the non-inverting and the inverting outputs of the flip-flop. A source follower buffer is coupled to an output of each of the high voltage level translators.

In accordance with another embodiment, a 5 Ringer Equivalent Number (REN) ringer circuit has a square wave generator. A flip-flop is coupled to the wave generator and has a non-inverting and an inverting output. A high voltage level translator with RC shaping is coupled to each of the non-inverting and the inverting outputs of the flip-flop. A source follower buffer is coupled to an output of each of the high voltage level translators.

The present invention is best understood by reference to the following detailed description when read in conjunction with the accompanying drawings.

DETAILED DESCRIPTION

REN stands for Ringer Equivalent Number. It is a measurement of how much ringing power certain telephone equipment takes. REN numbers are used in the USA to determine how many pieces of telephone equipment one may can connect to the same telephone line and still get the equipment ringing properly (typical line can drive about 3-5 REN load). The definition of 1 REN is the ringer power required by one ringer of an AT&T standard 500 series telephone set in single-party configuration (ringer placed ACROSS the line).

The present invention provides a low cost ring generator circuit that is capable of driving up to 5 REN, ringer equivalent number, by using a simple high voltage level translator then buffering it with a source follower stage.

Figure 1:
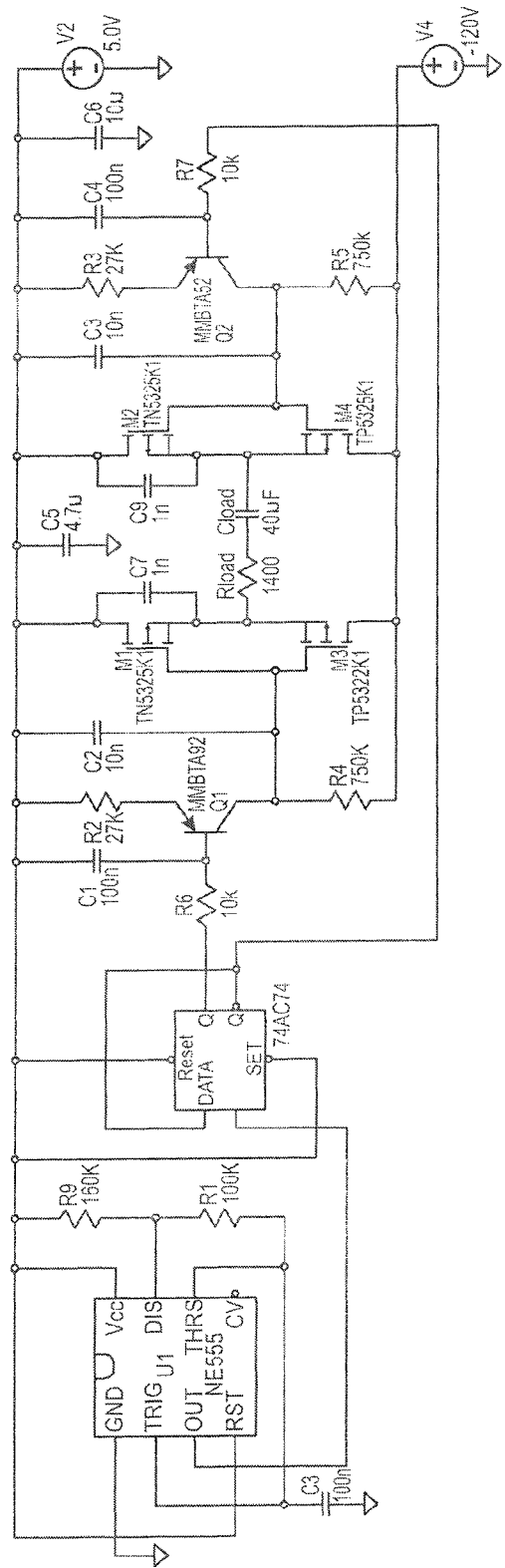
FIG. 1 is a simplified block diagram of one embodiment of the present invention.

Referring to FIG. 1, a detailed schematic of the ring generator 100 is shown. The ring generator 100 has a wave generator 102. In the present embodiment, the wave generator has a timing device U1. The timing device U1 may be an oscillator, pulse generator, or the like. The listing of the above is given as an example and should not be seen in a limiting manner. A capacitive element C8 has a first terminal coupled to an output OUT of the timing device U1 and a second terminal coupled to ground. A resistive element R1 has a first terminal coupled to a discharge terminal DIS of the timing device U1 and a second terminal coupled to the capacitive element C8. A resistive element R9 has a first terminal coupled to the discharge terminal DIS of the timing device U1 and a second terminal coupled to a reset terminal RST of the timing device U1. A resistive element R1 has a first terminal coupled to the discharge terminal DIS of the timing device U1 and a second terminal coupled to a threshold terminal THRS of the timing device U1.

U1, R1, R9, and C8 are used to generate a square wave coming from the out pin of U1. In accordance with one embodiment, 5V, 40 Hz square wave is produced. The square wave signal is fed into a flip-flop 20 which divides the frequency in half. Thus, in the present embodiment, the 40 Hz signal is divided in half to produce a 20 Hz square wave signal. The 20 Hz square has a duty cycle that is 50%. Inverting and non-inverting signals are coming out of Q and Q bar outputs of the flip-flop 20. The outputs of the flip-flop 20 go into two separate high voltage level translators 30A and 30B. In accordance with one embodiment, the high voltage level translators 30A and 30B have RC shaping.

The high voltage translator 30A for output Q comprises resistive elements R6, R2, and R4, capacitive elements C1 and C2 and transistor Q1. The resistive element R6 has a first terminal coupled to the Q output of the flip-flop 20. A second terminal of the resistive element R6 is coupled to a base terminal of the transistor Q1. The resistive element R2 has a first terminal coupled to a voltage supply V2 and a second terminal coupled to an emitter terminal of the transistor Q1. The resistive element R4 has a first terminal coupled to a collector terminal of the transistor Q1 and a second terminal coupled to a second voltage supply V4. The capacitive element C1 has a first terminal coupled to the voltage supply V2 and a second terminal coupled to the base terminal of the transistor Q1. The capacitive element C2 has a first terminal coupled to the voltage source V2 and a second terminal coupled to the collector terminal of transistor Q1.

The high voltage translator 30B for output Q bar is comprises resistive elements R7, R5, and R3, capacitive elements C4 and C3 and transistor Q2. The resistive element R7 has a first terminal coupled to the Q bar output of the flip-flop 20. A second terminal of the resistive element R7 is coupled to a base terminal of the transistor Q2. The resistive element R3 has a first terminal coupled to a voltage supply V2 and a second terminal coupled to an emitter terminal of the transistor Q2. The resistive element R5 has a first terminal coupled to a collector terminal of the transistor Q2 and a second terminal coupled to a second voltage supply V4. The capacitive element C4 has a first terminal coupled to the voltage supply V2 and a second terminal coupled to the base terminal of the transistor Q2. The capacitive element C3 has a first terminal coupled to the voltage source V2 and a second terminal coupled to the collector terminal of transistor Q2.

The output of the high voltage level translators 30A and 30B are the collectors of Q1 and Q2 respectively. The high voltage level translator will take in the 0 to 5V signals and translates them to swing close to +5V and 120V with an RC like waveform. With different values of RC, faster or slower rise and fall times may be obtained.

The outputs for the high voltage level translators 30A and 30B are relatively high impedance. It will not be able to drive any significant load. A source follower buffer stage 40 is added to each output of the high voltage level translators 30A and 30B.

Transistors M1 and M3 are the source follower buffer 40A for output collector Q1. Transistors M2 and M4 are the source follower buffer 40B for output collector Q2. The outputs of the source follower are the source pins for M1, M2, M3, and M4. The source followers 40A and 40B will supply the current required to drive 5 RENs. Rload of 1400 ohms in series with a Cload of 40 uF acts as an equivalent load of 5 RENs. The 5 REN load is connected across the two buffers as shown in FIG. 1.

Figure 2:
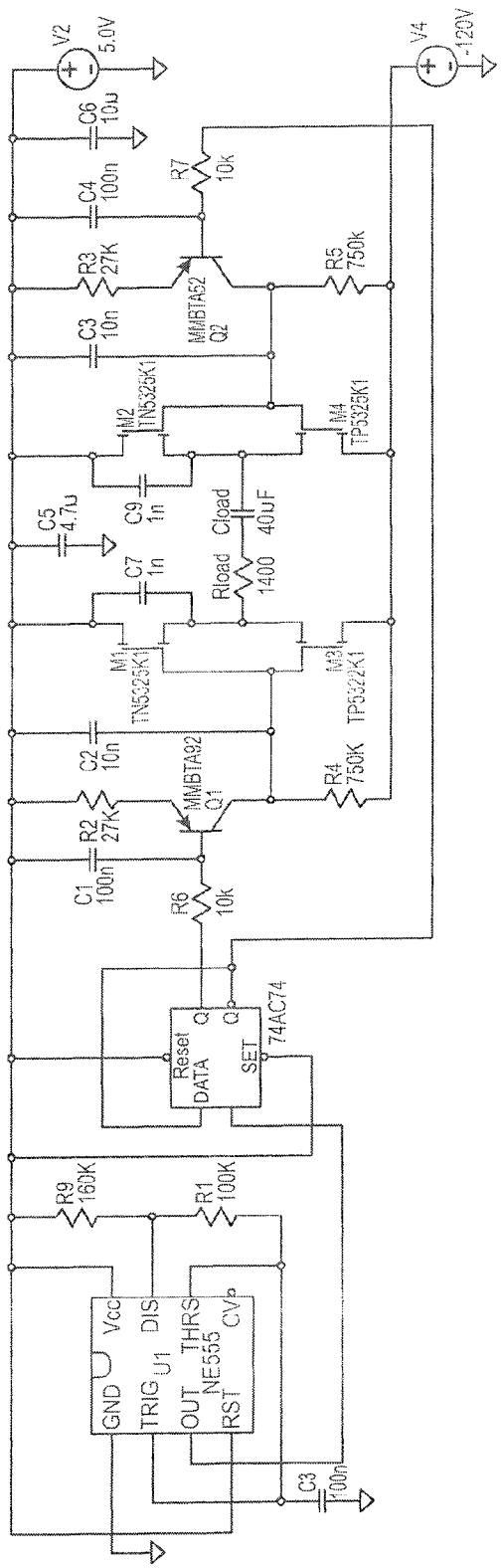
FIG. 2 is a simplified block diagram of another embodiment of the present invention.

FIG. 1 shows the source follower buffer 40A and 40B formed of a P-channel MOSFET and an N-channel MOSFET configured as a source follower on the output stage to supply the load current. However, alternatively, as shown in FIG. 2, a PNP bipolar transistor and an NPN bipolar transistor may be configured as an emitter followers on the output stage to supply the load current.

Figure 3:
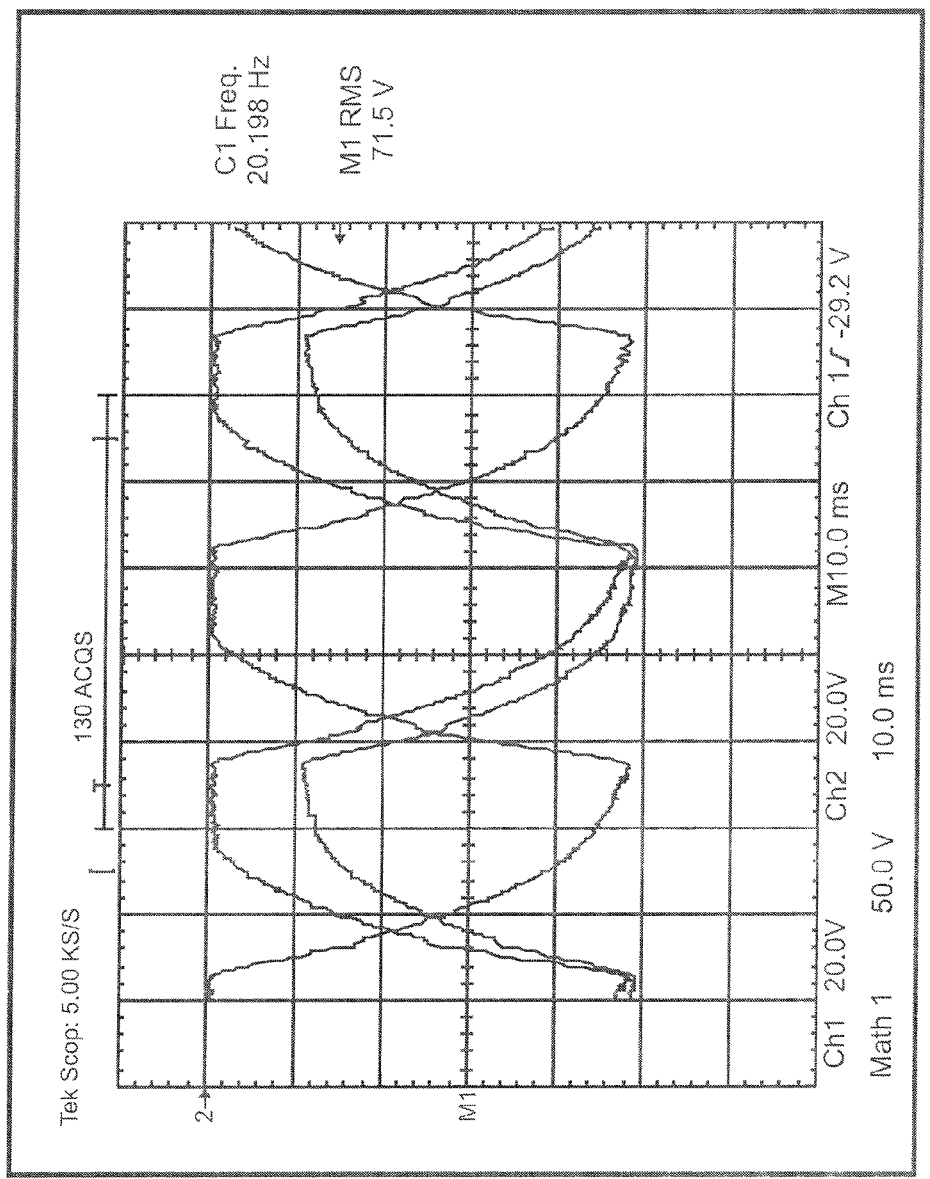
FIG. 3 is a chart showing waveforms from the circuit of the present invention.
Common reference numerals are used throughout the drawings and detailed description to indicate like elements.

FIG. 3 shows the bench test waveforms of the present invention. Channel 1 and Channel 2 are the outputs of the source followers. M1 is a math waveform which is channel 1 minus channel 2. The output of M1 is showing 71.5 Vrms.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A 5 Ringer Equivalent Number (REN) ringer circuit comprising:
   a wave generator;
   a flip-flop coupled to the wave generator and having a non-inverting and an inverting output;
   a high voltage level translator having RC shaping coupled to each of the non-inverting and an inverting outputs of the flip-flop and having a collector output terminal; and
   a source follower buffer coupled to the collector output terminal of each of the high voltage level translators.

2. A 5 Ringer Equivalent Number (REN) ringer circuit in accordance with claim 1 wherein the wave generator generates a square wave.

3. A 5 Ringer Equivalent Number (REN) ringer circuit in accordance with claim 1 wherein the source follower buffer comprises a P-channel MOSFET and an N-channel MOSFET coupled as a source follower.

4. A 5 Ringer Equivalent Number (REN) ringer circuit in accordance with claim 1 wherein the source follower buffer comprises a PNP bipolar transistor and an NPN bipolar transistor coupled as an emitter follower.

5. A 5 Ringer Equivalent Number (REN) ringer circuit in accordance with claim 1 wherein the level translator coupled to the non-inverting output comprises:
   a first transistor;
   a first resistive element having a first terminal coupled to the non-inverting output of the flip-flop and a second terminal coupled to a base terminal of the first transistor;
   a second resistive element having a first terminal coupled to a first voltage supply and a second terminal coupled to an emitter terminal of the first transistor Q1;
   a third resistive element having a first terminal coupled to a collector terminal of the first transistor and a second terminal coupled to a second voltage supply;
   a first capacitive element having a first terminal coupled to the second voltage supply and a second terminal coupled to the base terminal of the first transistor; and
   a second capacitive element having a first terminal coupled to the second voltage source and a second terminal coupled to the collector terminal of the first transistor.

6. A 5 Ringer Equivalent Number (REN) ringer circuit in accordance with claim 5 wherein the level translator coupled to the inverting output comprises:
   a second transistor;
   a fourth resistive element having a first terminal coupled to the inverting output of the flip-flop and a second terminal coupled to a base terminal of the second transistor;
   a fifth resistive element having a first terminal coupled to the second voltage supply and a second terminal coupled to an emitter terminal of the second transistor;
   a sixth resistive element having a first terminal coupled to a collector terminal of the second transistor and a second terminal coupled to the second voltage supply;
   a third capacitive element having a first terminal coupled to the second voltage supply and a second terminal coupled to the base terminal of the second transistor; and
   a fourth capacitive element having a first terminal coupled to the second voltage source and a second terminal coupled to the collector terminal of second transistor.

7. A 5 Ringer Equivalent Number (REN) ringer circuit in accordance with claim 5 wherein the first transistor is a PNP bipolar transistor.

8. A 5 Ringer Equivalent Number (REN) ringer circuit in accordance with claim 6 wherein the second transistor is a PNP bipolar transistor.

9. A 5 Ringer Equivalent Number (REN) ringer circuit comprising:
   a square wave generator;
   a flip-flop coupled to the wave generator and having a non-inverting and an inverting output;

a high voltage level translator with RC shaping coupled to each of the non-inverting and an inverting outputs of the flip-flop and having a collector output terminal; and a source follower buffer coupled to the collector output terminal of each of the high voltage level translators.

10. A 5 Ringer Equivalent Number (REN) ringer circuit in accordance with claim 9 wherein the source follower buffer comprises a P-channel MOSFET and an N-channel MOSFET coupled as a source follower.

11. A 5 Ringer Equivalent Number (REN) ringer circuit in accordance with claim 9 wherein the source follower buffer comprises a PNP bipolar transistor and an NPN bipolar transistor coupled as an emitter follower.

12. A 5 Ringer Equivalent Number (REN) ringer circuit in accordance with claim 9 wherein the level translator coupled to the non-inverting output comprises:

a first transistor;
a first resistive element having a first terminal coupled to the non-inverting output of the flip-flop and a second terminal coupled to a base terminal of the first transistor;
a second resistive element having a first terminal coupled to a first voltage supply and a second terminal coupled to an emitter terminal of the first transistor;
a third resistive element having a first terminal coupled to a collector terminal of the first transistor and a second terminal coupled to a second voltage supply;
a first capacitive element having a first terminal coupled to the second voltage supply and a second terminal coupled to the base terminal of the first transistor; and
a second capacitive element having a first terminal coupled to the second voltage source and a second terminal coupled to the collector terminal of the first transistor.

13. A 5 Ringer Equivalent Number (REN) ringer circuit in accordance with claim 12 wherein the level translator coupled to the inverting output comprises:

a second transistor;
a fourth resistive element having a first terminal coupled to the inverting output of the flip-flop and a second terminal coupled to a base terminal of the second transistor;
a fifth resistive element having a first terminal coupled to the second voltage supply and a second terminal coupled to an emitter terminal of the second transistor;
a sixth resistive element having a first terminal coupled to a collector terminal of the second transistor and a second terminal coupled to the second voltage supply;
a third capacitive element having a first terminal coupled to the second voltage supply and a second terminal coupled to the base terminal of the second transistor; and
a fourth capacitive element having a first terminal coupled to the second voltage source and a second terminal coupled to the collector terminal of second transistor.

14. A 5 Ringer Equivalent Number (REN) ringer circuit in accordance with claim 12 wherein the first transistor is a PNP bipolar transistor.

15. A 5 Ringer Equivalent Number (REN) ringer circuit in accordance with claim 13 wherein the second transistor is a PNP bipolar transistor.

16. A 5 Ringer Equivalent Number (REN) ringer circuit comprising:

a square wave generator;
a flip-flop coupled to the wave generator and having a non-inverting and an inverting output;
a high voltage level translator with RC shaping coupled to each of the non-inverting and an inverting outputs of the flip-flop; and
a source follower buffer coupled to an output collector terminal of each of the high voltage level translators, wherein the source follower buffer comprises a P-channel MOSFET and an N-channel MOSFET coupled as a source follower.

17. A 5 Ringer Equivalent Number (REN) ringer circuit in accordance with claim 16 wherein each level translator comprises:

a first transistor;
a first resistive element having a first terminal coupled to the non-inverting output of the flip-flop and a second terminal coupled to a base terminal of the first transistor;
a second resistive element having a first terminal coupled to a first voltage supply and a second terminal coupled to an emitter terminal of the first transistor;
a third resistive element having a first terminal coupled to a collector terminal of the first transistor and a second terminal coupled to a second voltage supply;
a first capacitive element having a first terminal coupled to the second voltage supply and a second terminal coupled to the base terminal of the first transistor; and
a second capacitive element having a first terminal coupled to the second voltage source and a second terminal coupled to the collector terminal of the first transistor.

18. A 5 Ringer Equivalent Number (REN) ringer circuit comprising:

a square wave generator;
a flip-flop coupled to the wave generator and having a non-inverting and an inverting output;
a high voltage level translator with RC shaping coupled to each of the non-inverting and an inverting outputs of the flip-flop; and
a buffer coupled to an output collector terminal of each of the high voltage level translators, wherein the buffer comprises a PNP bipolar transistor and an NPN bipolar transistor coupled as an emitter follower.

19. A 5 Ringer Equivalent Number (REN) ringer circuit in accordance with claim 18 wherein each level translator comprises:

a first transistor;
a first resistive element having a first terminal coupled to the non-inverting output of the flip-flop and a second terminal coupled to a base terminal of the first transistor;
a second resistive element having a first terminal coupled to a first voltage supply and a second terminal coupled to an emitter terminal of the first transistor;
a third resistive element having a first terminal coupled to a collector terminal of the first transistor and a second terminal coupled to a second voltage supply;
a first capacitive element having a first terminal coupled to the second voltage supply and a second terminal coupled to the base terminal of the first transistor; and
a second capacitive element having a first terminal coupled to the second voltage source and a second terminal coupled to the collector terminal of the first transistor.

20. A 5 Ringer Equivalent Number (REN) ringer circuit in accordance with claim 19 wherein the transistor is a PNP bipolar transistor.

* * * * *